March 21, 1967 W. VANGOR 3,309,944
APPARATUS FOR POSITIONING AND INDEXING WORKPIECES
Filed June 8, 1964 3 Sheets-Sheet 1

INVENTOR.
William Vangor
BY
Johnson and Kline
AGENT

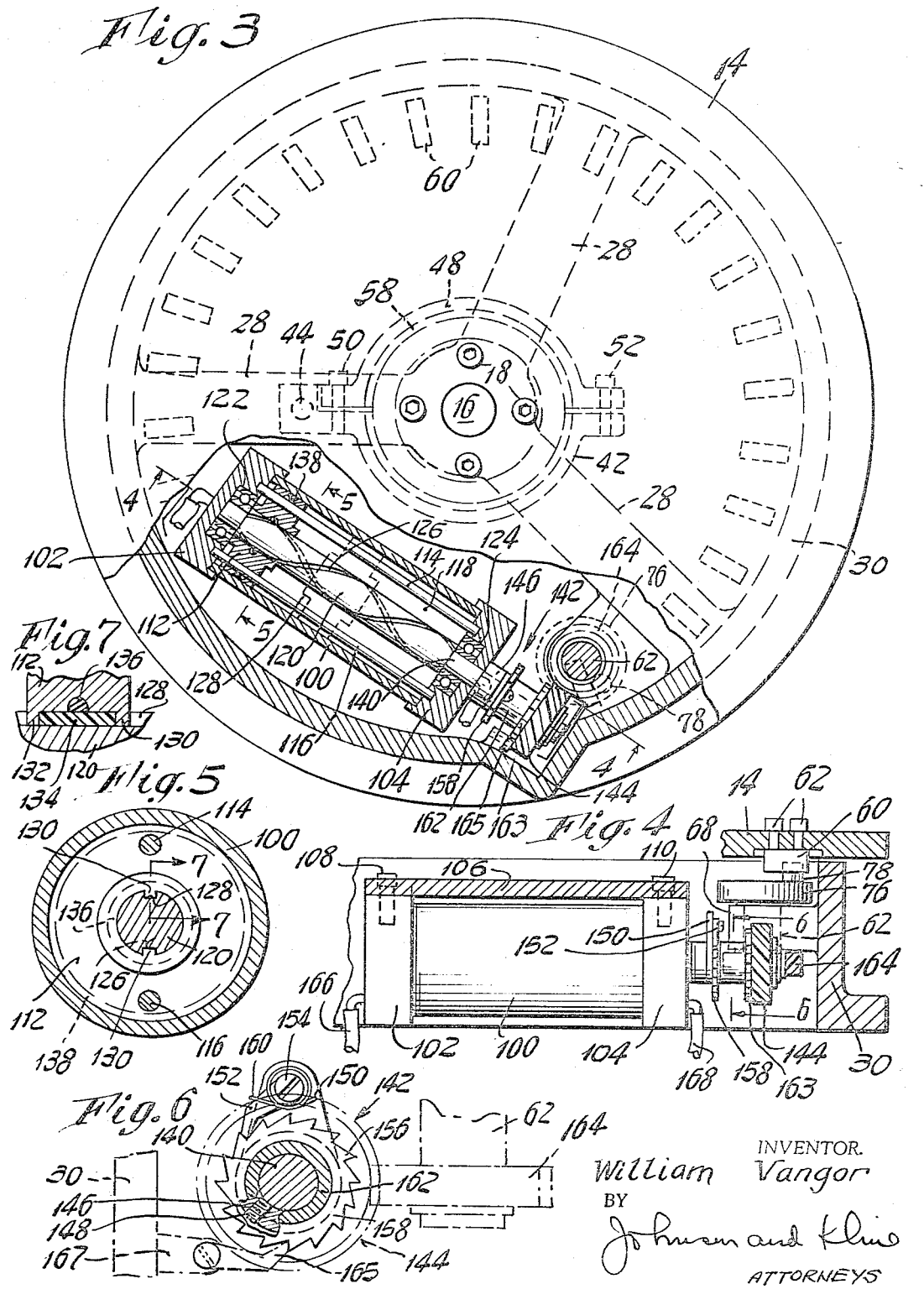

INVENTOR.
William Vangor
BY
Johnson and Kline
ATTORNEYS

United States Patent Office 3,309,944
Patented Mar. 21, 1967

3,309,944
APPARATUS FOR POSITIONING AND INDEXING
WORKPIECES
William Vanger, 325 High Ridge Road,
Fairfield, Conn. 06430
Filed June 8, 1964, Ser. No. 373,338
9 Claims. (Cl. 74—822)

This invention relates generally to apparatus for transporting and indexing workpieces. More particularly, the invention relates to an apparatus for transporting a plurality of workpieces in a circular path and for positioning the workpieces in a determinate location for short intervals of time during which the workpieces are to have some operation performed thereupon or are to be otherwise handled.

Devices of the general nature of this invention have been long known in the prior art and find extensive utility in the field of automatic work performing machines which in some way handle and/or operate upon a plurality of successively fed workpieces, articles, or other relatively small items of whatever nature desired. For the most part, however, such devices have not only been incorporated into the parent work performing machine in such a manner as to be an integral component thereof, but also have been characterized by being of relatively complicated structure and being driven or actuated through complicated or intricate drive connecting mechanisms from the power source for the parent work performing machine. This is so principally for the reason that such work transporting and indexing apparatus must move, or rotate, as the case may be, in an intermittent or step-by-step manner, and the mechanism for achieving such operation, when tied in with the operating mechanism of the work performing machine, has often become complicated, unwieldy and expensive.

The apparatus of this invention overcomes these and other prior art disadvantages and shortcomings by providing a workpiece transporting and indexing apparatus which is a self-contained unit and is both readily adaptable to a work performing machine and useful separately therefrom as an independent apparatus. It is extremely simple in construction and efficient and accurate in operation, and achieves to a great extent the objects and advantages hereinafter set forth.

To this end, the apparatus of this invention comprises generally a flat circular support or table for the workpieces which is suitably rotatably mounted in a supporting frame, the frame also supporting an arresting or braking means which cooperates with the table to prevent motion thereof when no driving force is being applied to the table, and which offers resistance to rotation of the table when a driving force is exerted thereon. A plurality of abutment members are secured preferably to the underside of the table and spaced apart circumferentially adjacent to or slightly spaced from the periphery of the table. A rotary drive means is mounted upon a portion of the frame which extends adjacent to the periphery of the table and includes a member movable in an orbital path which intersects the path of travel of the abutment members whereby the driving member, during a portion of its orbital path and on successive orbits thereof, engages and moves the abutment members through a determinate arc. Thus the table is advanced in a step-by-step or intermittent rotary manner, in which the table is gradually accelerated from zero to a maximum angular velocity and then decelerated back to zero velocity by virtue of the constantly changing vector angle of the driving force being applied to the abutment members. By virtue of the unique cooperation between the driving member and the aforesaid arresting or braking means, the table is effectively moved a predetermined desired distance and is then held motionless during a given interval of time to allow performance of a desired working operation. The driving member is actuated either by an extremely simple and efficient power take-off means from a parent machine, or it may be actuated by a self-contained power means thereby rendering the apparatus completely independent of the parent machine.

Having thus described the invention in general terms, it becomes a principal object thereof to provide an apparatus for transporting and indexing workpieces having a work supporting surface which is intermittently movable through a determinate arc to accurately position workpieces supported thereon.

It is another object of this invention to provide an apparatus for transporting and indexing workpieces in which a suitable work supporting table is intermittently moved through a determinate arc and is securely held or positively locked against any movement during periods of dwell of the moving force.

It is the object of the present invention to provide an apparatus for transporting and indexing workpieces in which a work supporting table is suitably supported for rotation in a frame with cooperating motion arresting means.

It is yet another object of the present invention to provide an apparatus for transporting and indexing workpieces which is substantially self-contained, and which is readily adaptable to, or associated with, a parent work performing machine, and having means by which the apparatus is simply and efficiently driven from a power take-off of the parent machine.

It is a further object of this invention to provide an apparatus for transporting and indexing workpieces which is completely self-contained and which includes a suitable power means whereby the apparatus achieves utility separate and apart from any parent specific work performing machine.

It is still a further object of this invention to provide an apparatus for transporting and indexing workpieces which is extremely simple in construction, positive and efficient in operation and inexpensive to manufacture, install, and maintain.

These and other objects of the present invention will become apparent from a consideration of the following detailed description thereof when considered in conjunction with the accompanying drawings in which:

FIGURE 3 is a view similar to FIGURE 2, illustrating a modified form of drive means;

FIGURE 4 is a view partly in section, taken on the line 4—4 of FIGURE 3;

FIGURE 5 is an enlarged sectional view through the driving means, taken on the line 5—5 of FIGURE 3;

FIGURE 6 is an enlarged partial sectional view with parts broken away to show detail, taken on the line 6—6 of FIGURE 4, illustrating the unidirectional drive clutch;

FIGURE 7 is a fragmentary sectional view, enlarged again, taken on the line 7—7 of FIGURE 5, illustrating the piston and drive shaft engaging means.

Figure 1:
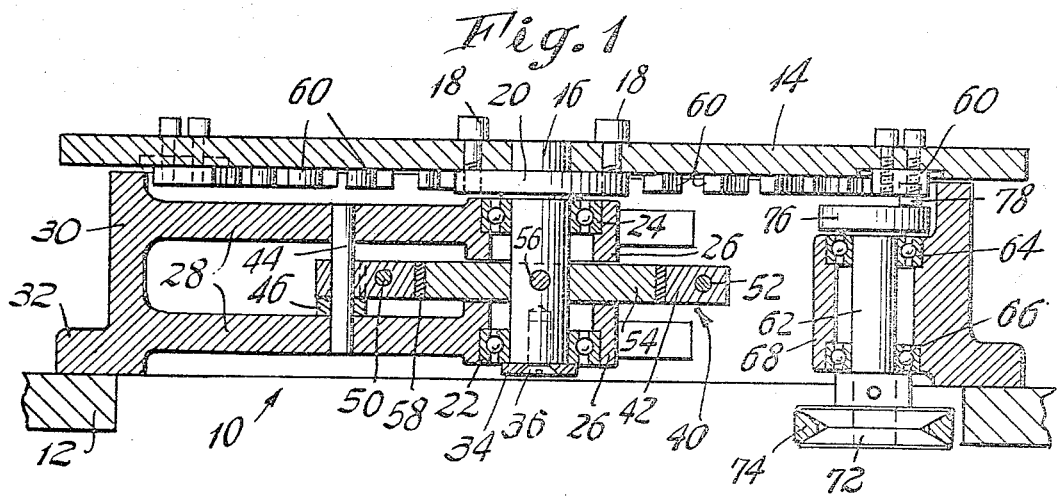
FIGURE 1 is an elevation in section, taken on the line 1—1 of FIGURE 2, illustrating one embodiment of the apparatus of this invention.
Figure 2:
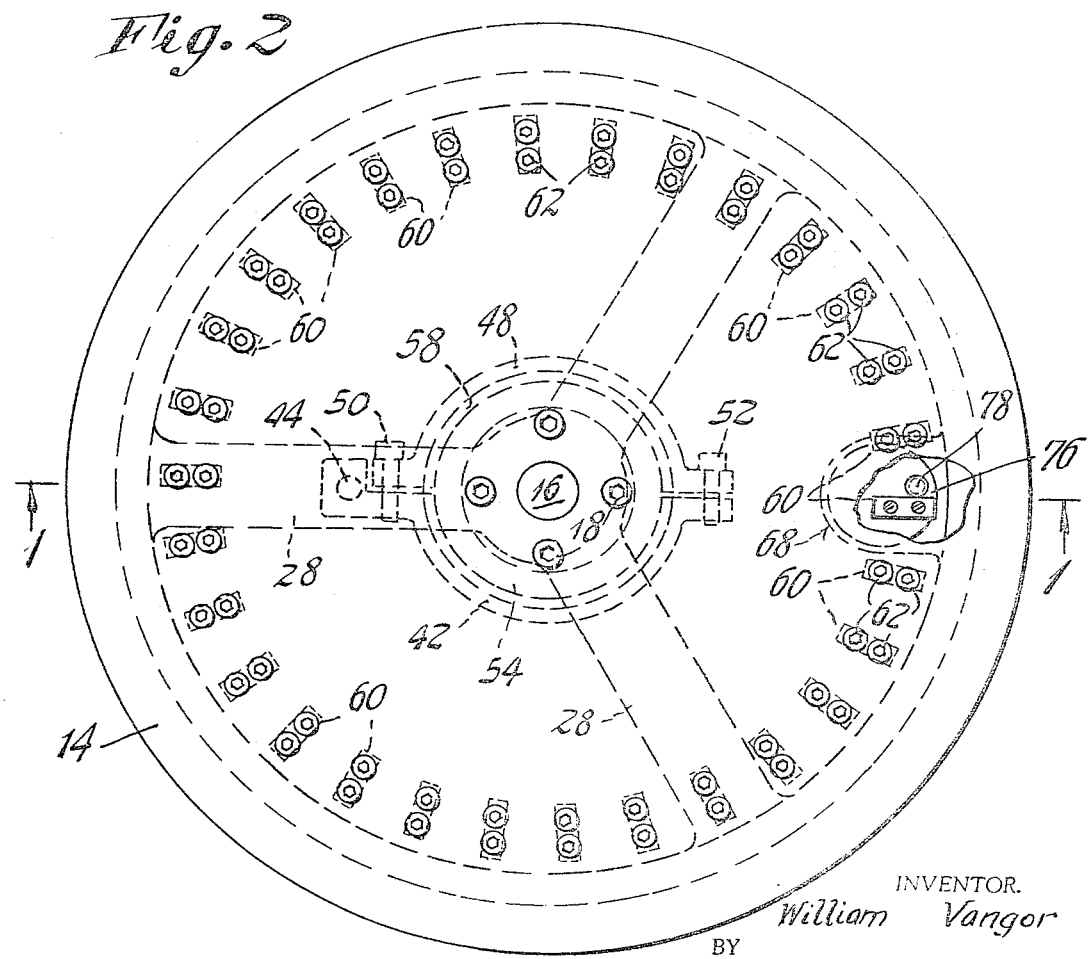
FIGURE 2 is a plan view of the apparatus of FIGURE 1 with a small portion of the work supporting table broken away to illustrate detail.

Referring now to the drawings and particularly to FIGS. 1 and 2, which illustrate one embodiment of the present invention, the reference numeral 10 indicates generally a workpiece transporting and indexing apparatus which may be conveniently mounted by any suitable means upon a portion of the framework 12 of a parent work performing machine, not shown. It is to be understood that the apparatus 10 may be incorporated as an integral component of the parent machine during the manufacture thereof, or may in the alternative be attached to the parent machine subsequent to manufacture thereof and either prior or subsequent to installation of the parent machine at the location of use.

The apparatus 10 is seen to comprise a workpiece supporting table 14 which is preferably of circular configuration and substantially flat. While the table 14 is illustrated as being mounted in a horizontal position, it will be apparent that the table, as well as the rest of the apparatus, may be disposed at any desired angle relative to a horizontal plane assuming the provision of suitable means for holding the workpieces or otherwise preventing them from falling off the table.

A central shaft 16 is suitably secured to the table such as by means of a plurality of bolts 18 which pass through the table and are threadedly engaged with a flange 20 on the shaft 16.

The shaft 16 is mounted for rotation by suitable means such as ball-bearings 22 and 24 disposed in a bracket 26 which, in the illustrated embodiment, is formed by circular extensions of the bifurcated fingers 28 which extend radially inwardly from an annulus 30 which has a suitable mounting piece 32 for attaching the apparatus 10 to the framework 12 of a parent machine or which independently supports the apparatus. The members 26, 28, 30 and 32 constitute a frame for supporting the apparatus of this invention. A suitable securing means, such as a washer 34 and a screw 36, retain the ball-bearing and shaft assembly together.

Interposed in operative relation between the shaft 16 and the frame members 28 is a motion arresting or braking means 40 which is seen to comprise a circular clamp consisting of one semicircular clamp member 42 secured to the frame fingers 28 by means of a pin 44 and a supporting boss 46. Another semicircular clamp member 48 is secured to the clamp member 42 by means of bolts 50 and 52 which pass through suitable radial extensions of the clamp members 42 and 48. The bolts 50 and 52 are threadedly engaged with the clamp member 42 to provide for adjustment of the braking effect as will hereinafter become more apparent.

A friction disc 54 is fixedly mounted on the shaft 16 by means of a pin 56 in inner concentric relation with the clamp 40. A suitable friction element 58, such as a fibre brake band, is interposed in contacting relationship between the clamp members 42 and 48 and the peripheral surface of the friction disc 54 for the purpose of gripping the friction disc 54 with sufficient force to prevent rotation thereof when no driving force is being applied to the table 14, and to offer substantial resistance to rotation of the disc 54 when a driving force is being applied to the table 14. As indicated briefly above, the holding force of the friction element 58 may be increased or decreased by appropriate adjustment of the bolts 50 and 52.

As best seen in FIG. 2, the table 14 is provided with a plurality of abutment members 60 which are circumferentially spaced apart adjacent or somewhat inwardly from the periphery of the table 14. The abutment members 60, which are of generally rectangular configuration, are secured preferably to the undersurface of the table 14 in any convenient manner such as by means of threaded bolts 62. The abutment members are placed apart a predetermined amount in accordance with the determinate arc through which the table will move in step-by-step fashion, and in accordance with the prescribed orbital path of a driving member as more fully explained hereinbelow.

Referring now to FIG. 1, it will be seen that the driving means is secured to the annulus or peripheral frame portion 30 in operative association with the abutment members 60. The driving means comprises a shaft 62 journaled for rotation in ball-bearings 64 and 66 which are supported in a suitable bracket 68 secured to the inner wall of the annulus 30. The shaft 62 is provided with a drive pulley 72 for receiving a drive belt 74 which is driven from any suitable power take-off of the parent work performing machine or other suitable power supply means. Thus shaft 62 may be continuously or intermittently rotated depending on the situation in which it is used.

Secured to the upper end of the shaft 62 is a disc 76 having a pin or roller 78 or other suitable drive member eccentrically disposed on the disc 76 in such manner that rotation of the disc 76 moves the roller 78 in an orbital path about the central vertical axis of the shaft 62. As clearly seen in FIG. 2, the orbital path of the roller 78 intersects at least in part with the circular path of travel of the abutment members 60, the size, spacing and arrangement of the parts being such that the roller 78 will move a given abutment member 60 and the table 14 through a determinate arc upon each complete revolution of the disc 76 and orbit of the roller 78. The spacing between the abutment members 60 is such that the succeeding abutment member will be in position to be engaged by the roller 78 at the same instant that a prior abutment member has just been disengaged by the roller 78.

It will be readily apparent that, in the operation of the apparatus as thus far described, driving of the pulley 72 by the belt 74, either continuously or intermittently, will correspondingly rotate the shaft 62 and the disc 76 about the longitudinal axis of the shaft 62 thereby moving the roller 78 in an orbital path about said axis. As the pin 78 engages an abutment member 60, the vector angle of the driving force will be at a maximum relative to the direction of travel of an abutment member 60 thereby applying a minimum driving force to the abutment member. As the roller 78 begins to move the abutment member 60, the vector angle will gradually decrease to zero at which point the driving force is tangential to the direction of movement of the abutment member 60 and the velocity thereof will be at a maximum. As the roller 78 continues to move the abutment member 60, the vector angle of the driving force of the roller 78 will again increase to a maximum during which time the abutment member 60 and the table 14 will decelerate, the deceleration of these parts being assisted by the braking force of the braking means 40. As the roller 78 continues to orbit and passes out of engagement with the abutment member 60, the table 14 will immediately cease to move and will remain stationary throughout the remaining orbit of the roller 78 until the roller engages the next succeeding abutment member 60 to repeat the cycle of operation. It is apparent from the above that the roller 78 is operable through a portion of each revolution to engage and move any one of the abutment members 60 through a predetermined arc in opposition to the resistance of the braking means 40, and thereby to rotate the table 14 intermittently in response to successive rotations of the roller 78 in its orbital path.

Referring now to FIGS. 3–7, another embodiment of the invention is illustrated in which there is provided a compact self-contained power and driving means whereby the apparatus achieves utility as a workpiece transporting and indexing device separate and apart from any parent work performing machine. To this end the apparatus of this embodiment is identical with that described above with regard to the work supporting table 14, its manner of support in the central portion 26 of the frame members 28, the braking apparatus 40 and the driving means constituting elements 62, 76 and the roller 78. A detailed description of these components is, therefore, not deemed necessary for the full understanding of this embodiment of the invention.

With reference now to FIG. 3, the power means is seen to comprise a cylinder 100 having opposite end closures 102 and 104, the cylinder being secured to the peripheral portion 30 of the apparatus frame by means of any suitable bracket 106 and bolts 108 and 110 as seen in FIG. 4.

A piston 112 is slidably mounted within the cylinder 100 for reciprocation between the cylinder end closures 102 and 104 by means fully described hereinbelow. Also mounted within cylinder 100 is any suitable means for preventing rotation of the piston 112 which, in the illustrated embodiment, takes the form of a pair of rods 114 and 116 supported by the end closures 102 and 104, the rods passing through suitable bores formed in the piston 112 so that the piston can slide relative to the rods 114 and 116 but cannot rotate relative to the cylinder 100. The piston is also provided with a central bore 118 through which passes a driving shaft 120 which is journaled for rotation in suitable bearings 122 and 124 in the end closures 102 and 104 respectively. The driving shaft 120 is provided with at least one, and preferably two, helical or spiral grooves 126 and 128. The piston 112 is provided with means cooperating with the grooves 126 and 128 which, as best seen in FIG. 7, takes the form of a pair of keys 130 and 132 which slide in the groove 128 as the piston reciprocates to and fro. A similar pair of keys is provided on the opposite side of the piston 112 for cooperation with the groove 126. A small sealing block 134 of any suitable elastomeric material is inserted between the keys 130 and 132 to prevent escape of fluid under pressure between the keys. An O-ring 136 of similar material is inserted in a suitable groove formed within the central bore 118 of the piston 112 and surrounds the driving shaft 120 in order to effect a sliding seal with the driving shaft 120 to prevent escape of fluid under pressure between the driving shaft and the piston. A similar O-ring 138 is similarly mounted around the periphery of the piston to effect a sliding seal between the piston and the inner wall of the cylinder.

Referring now to FIGS. 3, 4 and 6, it will be seen that the driving shaft 120 has a portion 140 of reduced diameter which extends through the end closure 104 of the cylinder 100 and considerably therebeyond. Mounted on the driving shaft extension 140 is a suitable unidirectional clutch means generally designated by the numeral 142 for converting oscillatory motion of the driving shaft 120 into intermittent rotary motion of a helical gear 144, or other suitable driving element, if the driving device is to be used in an application other than that disclosed. In this illustrated embodiment, the unidirectional clutch means comprises a collar 146 which is secured to the driving shaft extension 140 by means of the set screw 148 seen in FIG. 6. An upstanding bracket 150 is securely attached to the collar 146, the bracket supporting a pawl 152 which is loosely mounted on the bracket 150 by means of a screw 154 and which is urged into engagement with the teeth 156 of a ratchet wheel 158 by means of a spring 160. The ratchet wheel 158 is secured to a collar 162 which is loosely mounted on the driving shaft extension 140 and which also supports another ratchet wheel 163 which is engaged by a pawl 165 fixedly mounted in a bracket 167 on the frame portion 30 or elsewhere in a manner similar to the pawl 152. The driving gear 144 mentioned above is also secured to the collar 162 whereby the ratchet wheel 158, the collar 162, the ratchet wheel 163, and the driving gear 144 all rotate as a unit. Another gear 164 is mounted on the shaft 62 which is journaled for rotation in the bracket 68 in a manner identical to that illustrated in FIG. 1. Also, the disc 76, the drive roller 78 and the abutment members 60 are situated in a manner identical to that seen in FIG. 1 in order to drive the table 14 in the manner described hereinbelow.

In the operation of this modification, as any suitable fluid under pressure is admitted into cylinder 100 alternately through the fluid pressure connections 166 and 168 by any suitable valving means, which may be made to operate in timed sequence responsive to the actuation of an element of a parent work performing machine, or which may be made independently cyclically operative, the piston 112 is forced to move from the position illustrated in FIG. 3 to the opposite end of the cylinder during which movement the driving shaft 120 rotates in a counterclockwise direction when viewed from the right as in FIG. 5. Such rotation of the shaft 120 rotates the collar 146, the bracket 150 and the pawl 152 by virtue of the attachment of these elements to the driving shaft extension 140. The pawl 152 engages a tooth 156 of the ratchet wheel 158 thereby rotating the ratchet wheel 158, the collar 162, the ratchet wheel 163, the driving gear 144, the driven gear 164, the driven shaft 62, the disc 76 and the roller 78, rotation of the last four elements being clockwise when viewed in plan. The roller 78 effects movement of the abutment member 60 and the table 14 in the manner described above with respect to the embodiment illustrated in FIG. 1. At the proper time, as controlled by the valving means described above for controlling the application of fluid pressure, fluid pressure is admitted into the connection 168 to return the piston 112 to the position illustrated in FIG. 3, which causes clockwise rotation of the driving shaft 120 and the driving shaft extension 140, which in turn causes a similar rotation of the collar 146, the bracket 150 and the pawl 152. Due to the engagement of the fixed pawl 165 with the teeth of the ratchet wheel 163, clockwise rotation of driving gear 144 is prevented thereby holding the drive roller 78 stationary while the bracket 150 completes its return or non-fed oscillation, during which time the pawl 152 rides over the teeth 156 of the ratchet wheel 158. When the piston 112 returns to its position adjacent the end closure 102 of the cylinder 100, the mechanism has completed a cycle of operation and the parts are in position to commence another cycle upon actuation of the valving means to again admit fluid under pressure into the connection 166.

While in the illustrated embodiment the grooves 126 and 128 are formed so as to effect one revolution of the driving shaft 120 for one power stroke of the piston 112, it will be apparent that the pitch of the grooves 126 and 128 may be so modified as to effect less than one or a plurality of revolutions of the driving shaft 120 for a single power stroke of the piston 112, depending upon the desirability of the speed of rotation and period of dwell of the table 14. It should also be noted that the piston 112 is not limited to reciprocation with a constant amplitude or velocity, but may move in one direction with greater speed than in the other, and may be held in one position for a longer period of time than in another.

FIGS. 8–11 illustrate another embodiment of the invention in which the apparatus is independent of any parent work performing machine by virtue of having its own self-contained power means as in the manner of the previous embodiment. The major difference between this embodiment and the previous one resides in the location of the unidirectional clutch means which, rather than being an integral part of the power means, is now integrally associated with the drive means for the work supporting table whereby any conventional power means may be readily adapted to drive the apparatus.

Figure 8:
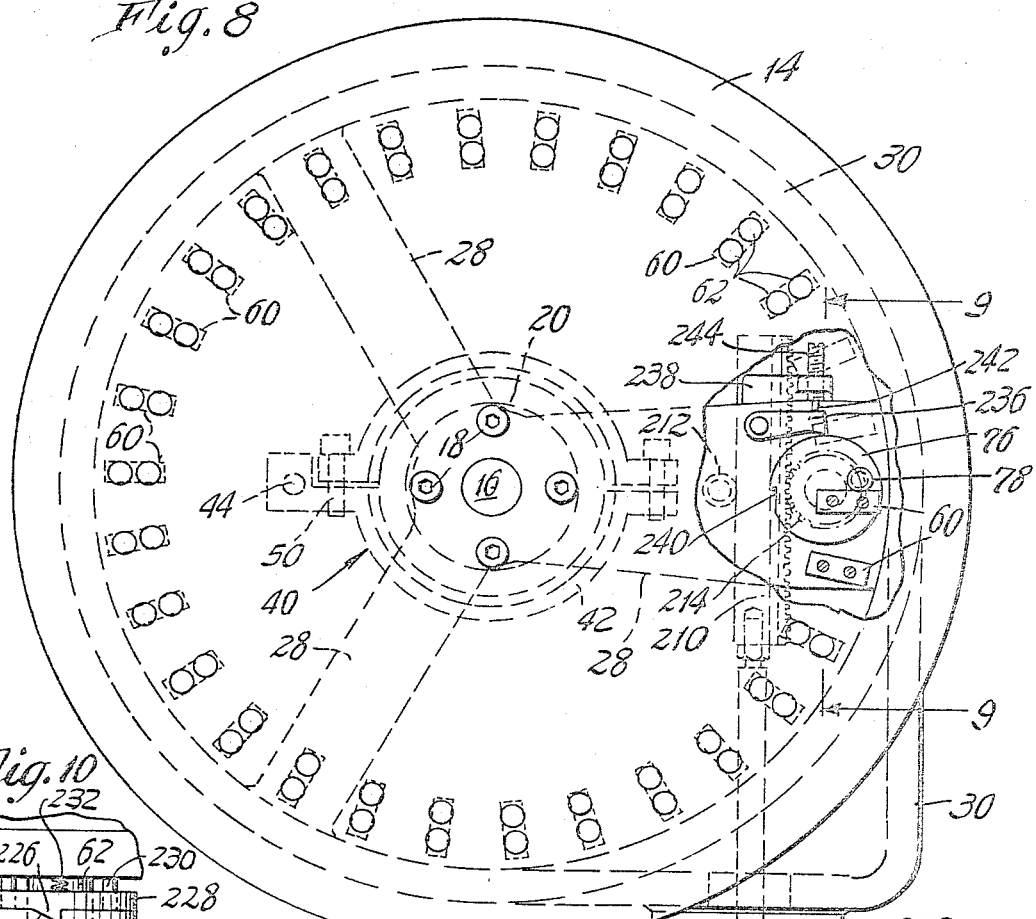
FIGURE 8 is a view similar to FIGURE 2 illustrating still another embodiment of the invention.
Figure 9:
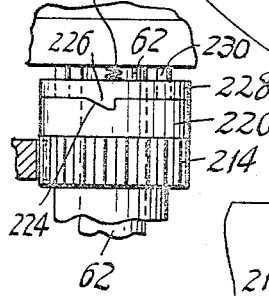
FIGURE 9 is an enlarged partial sectional view taken on the line 9—9 of FIGURE 8 illustrating the unidirectional drive clutch.
Figure 10:
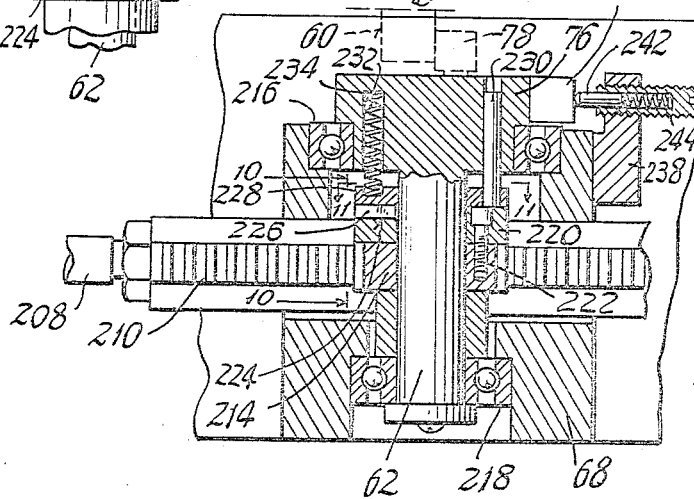
FIGURE 10 is a fragmentary side elevation taken on the line 10—10 of FIGURE 9.

To this end there is seen in FIG. 8, the table 14, the supporting shaft 16, the frame members 28 and 30, the braking means 40, and the drive means comprising elements 62, 76 and 78, together with the abutment members 60, all of which structure is substantially identical to that illustrated and described with regard to the embodiment of FIG. 1 and FIG 2. A further detailed description of these components is, therefore, deemed unnecessary.

As best seen in FIG. 8, a power cylinder 200 having a pair of end closures 202 and 204 is fixedly mounted on a suitable extension of the peripheral frame portion 30. A piston 206 is slidably mounted within the cylinder 200 and has attached thereto a piston rod 208 which extends through the end closure 202 and is connected by any suitable means to a rack 210, the latter being guided for linear reciprocatory movement by a guide roller 212.

The cylinder 200 is positioned such that the rack 210 engages with a driving gear or pinion 214 which is loosely or rotatably mounted on the driven shaft 62 which is supported in the bracket 68 by suitable bearings 216 and 218 in a manner similar to that seen in FIG. 1. A notched disc or fixed clutch plate 220 is secured to the gear 14 such as by means of the bolts 222 and has an upwardly facing notch or recess 224 which is adapted to cooperate with a correspondingly shaped tooth 226 formed on a movable clutch plate 228 which is slidably mounted on the shaft 62. The movable clutch plate 228 is guided for vertical reciprocatory movement by a plurality of pins 230 (FIG. 10) which are firmly anchored in the upper flanged portion of the shaft 62 and the drive disc 76 and extend through suitable bores provided in the clutch plate 228. The tooth 226 of the movable clutch plate 228 is urged toward the fixed clutch plate 220 and into engagement with the notch or recess 224 by a plurality of suitable springs 232 (FIG. 10) disposed in the bores 234 provided in the upper flange portion of the shaft 62 and the driving disc 76.

Figure 11:
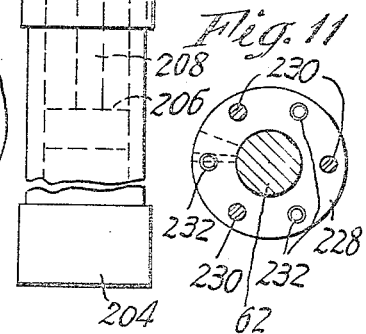
FIGURE 11 is a fragmentary partial sectional view taken on the line 11—11 of FIGURE 9.

As best seen in FIG. 11, the notch or recess 224 and the tooth 226 are correspondingly chamfered so that the fixed clutch plate 220 will drive the movable clutch plate 228 in one direction of rotation but not in the opposite direction. It should be noted that the notch 224 may be formed integrally with the gear 214, if desired, so that the gear 214 itself would then constitute the fixed clutch plate. It should also be noted that it is immaterial to the proper operation of the apparatus as to which of the clutch plates carries the tooth and the mating notch or recess.

In order to positively prevent counterrotation of the drive disc 76 and the roller 78 when the piston 206 and the associated driving components are making a return or non-driving stroke, a suitable back-check is provided which in the illustrated embodiment of FIG. 8 comprises a pawl 236 pivotally mounted on a bracket 238 which is suitably attached to either of the frame portions 28 or 30. The pawl 236 is adjustably urged toward the peripheral surface of the drive disc 76 and into engagement with a suitable recess 240 by suitable spring means such as the spring plunger 242 slidably received in a casing 244 which is threadably engaged with the bracket 238.

The operation of the power means of this embodiment is substantially as follows: As a fluid under pressure is admitted into the cylinder 200 on the cylinder side of the piston by any suitable connections (not shown), the piston, the piston rod and the rack, move to the right (as viewed in FIG. 9), causing clockwise rotation (as viewed in FIG. 8) of the gear 214 and the fixed clutch plate 220. By virtue of the engagement of the tooth 226 of the movable clutch plate with the recess 224 of the fixed clutch plate, the movable clutch plate is caused to rotate with the gear 214, which in turn causes rotation of the shaft 62 and the drive disc 76 through the pins 230, thereby driving the roller 78 to move an abutment member and the table in the manner fully described hereinabove. During this rotation of the drive disc, the pawl 236 rides over the peripheral surface of the drive disc 76. The parts are so arranged that when the piston 206 reaches the outermost limit of its driving stroke, the drive roller is out of engagement with an abutment member and the recess 240 of the drive disc 76 is in position to receive the pawl 236 under the urging of the spring plunger 242.

As pressure fluid is now admitted into the cylinder on the rod side of the piston, the piston, the piston rod and the rack reciprocate in the opposite direction to rotate the gear 214 counterclockwise (as viewed in FIG. 8). Corresponding rotation of the drive disc, the pins, the movable clutch plate and the shaft, is prevented, however, by the pawl 236. Therefore, the fixed clutch plate 224 rotates counterclockwise relative to the movable clutch plate 228, the latter being forced upwardly against the action of the springs 232 by the chamfered surfaces of the recess 224 and the tooth 226. The tooth and recess are so positioned that they will reengage by the movement of the piston to its opposite limit position at whch time these parts are in position to commence another cycle of operation.

It is apparent from the foregoing that there has been provided an apparatus for transporting and indexing workpieces which overcomes the foregoing disadvantages and achieves the aforementioned objects. It is to be understood that the embodiments described herein and shown in the accompanying drawings are merely illustrative and represent the best modes presently contemplated for carrying out the principles of the invention, and are susceptible to modification of form, size, detail and arrangement of parts, and that the invention is intended to cover all such modifications as may be encompassed within the spirit and scope thereof as defined in the appended claims.

What I claim and desire to secure by Letters Patent is:

1. Apparatus for transporting and indexing workpieces comprising
   (A) a flat substantially circular horizontally disposed workpiece supporting table, said table having a centrally located shaft extending from one side thereof,
   (B) a frame having means mounting said table shaft for rotation about a vertical axis and having a portion thereof disposed adjacent the periphery of said table,
   (C) braking means supported by said frame and operatively associated with said table shaft for preventing movement of said table shaft when no driving force is applied thereto and for imparting resistance to movement of said table shaft when a driving force is applied thereto,
   (D) a plurality of circumfernetially spaced apart abutment members secured to said one side of said table adjacent the periphery thereof,
   (E) rotary drive means mounted on said peripherally disposed portion of said frame and operable through a portion of each revolution to engage one of said abutment members and apply a driving force thereto sufficient to move said abutment member, table and table shaft through a predetermined arc in opposition to said resistance to movement of said braking means whereby said table rotates intermittently about said vertical axis in response to successive rotations of said drive means, said drive means comprising
      (1) a driven shaft journaled for rotation in said peripherally disposed portion of said frame, and
      (2) a drive member eccentrically connected to said driven shaft and constrained to move in an orbital path about said driven shaft which intersects the path of travel of said abutment members whereby said drive member engages and moves one of said abutment members during a portion of its orbital path, and
   (F) power means for rotating said drive means, said power means comprising
      (1) a cylinder secured to said peripheral portion of said frame and having opposite end closures,
      (2) a piston sealingly slidably mounted in said cylinder, (3) means interconnecting said piston and said driven shaft for imparting intermittent rotary motion to said driven shaft in response to reciprocatory motion of said piston and operable to cause rotation of said driven shaft when said piston moves in one direction and prevent counterrotation of said driven shaft when said piston moves in the opposite direction, and (4) means for introducing fluid under pressure into said cylinder successively on opposite sides of said piston whereby said piston reciprocates to and fro to drive said driven shaft, said drive member and said table intermittently in one direction only.

2. Apparatus as set forth in claim 1 wherein said means interconnecting said piston and said driven shaft comprises (A) a driving shaft journaled for rotation in said end closures, said driving shaft (1) passing through a central bore formed in said piston and (2) having an extension projecting through one of said end closures, (B) means interconnecting said piston and said driving shaft for imparting oscillatory rotary motion to said driving shaft in response to reciprocatory motion of said piston, (C) a driving gear loosely mounted on said driving shaft extension, (D) unidirectional clutch means interposed between said driving shaft and said driving gear for causing rotation of said driving gear when said driving shaft rotates in one direction and for preventing counterrotation of said driving gear when said driving shaft rotates in the opposite direction, and (E) means interconnecting said driving gear with said driven shaft.

3. Apparatus as set forth in claim 2 wherein said means interconnecting said piston and said driving shaft comprises (A) a spiral groove formed in said driving shaft, (B) a pair of keys formed in said bore of said piston and slidable in said groove, and (C) a sealing member disposed in said groove between said keys.

4. Apparatus as set forth in claim 2 wherein said unidirectional clutch means comprises (A) a first pawl secured to said driving shaft extension for rotation therewith, (B) a first ratchet wheel loosely mounted on said driving shaft extension in position to be driven in one direction by said first pawl, (C) a second ratchet wheel loosely mounted on said driving shaft extension and connected to said first ratchet wheel and to said driving gear, and (D) a second pawl fixedly mounted with respect to said ratchet wheels and engaging said second ratchet wheel in position to prevent rotation of said first and second ratchet wheels in a direction opposite to said direction of rotation in which said first ratchet wheel is driven by said first pawl.

5. Apparatus as set forth in claim 1 wherein said means interconnecting said piston and said driven shaft comprises (A) a piston rod secured to said piston and extending through one of said end closures, (B) a rack connected to said piston rod, (C) a driving gear loosely mounted on said driven shaft and operatively engaged with said rack to be oscillated in response to reciprocatory movement of said rack, and (D) unidirectional clutch means operatively associated with said driving gear and said driven shaft for causing rotation of said driven shaft when said driving gear rotates in one direction and for preventing counter-rotation of said driven shaft when said driving gear rotates in the opposite direction, said unidirectional clutch means comprising (1) a movable clutch plate slidably mounted on said driven shaft intermediate said driving gear and said drive member, (2) means interconnecting said clutch plate and said driven shaft for preventing relative rotation therebetween, (3) spring means urging said clutch plate toward said driving gear, and (4) cooperating tooth and notch means operatively affixed to said clutch plate and said driving gear in position to engage in driving relationship when said gear rotates in one direction and to disengage when said gear rotates in the opposite direction.

6. Apparatus as set forth in claim 5 wherein said unidirectional clutch means further includes (A) a pawl fixedly mounted with respect to said driven shaft, and (B) stop means secured to said driven shaft in position to be engaged by said pawl when said driving gear rotates in said opposite direction to lock said driven shaft against said counterrotation.

7. A device comprising (A) a cylinder having opposite end closures, (B) a piston sealingly slidably mounted in said cylinder, said piston having a central bore therethrough and means interconnected with said cylinder for preventing rotation of said piston, (C) a driving shaft journaled for rotation in said end closures, said shaft having an extension projecting through one of said end closures, (D) means interconnecting said piston and said driving shaft for imparting oscillatory motion to said driving shaft in response to reciprocatory motion of said piston, (E) a rotary driving element loosely mounted on said driving shaft extension, (F) a unidirectional drive clutch interposed between said driving shaft and said rotary driving element for causing rotation of said element when said driving shaft rotates in one direction and for preventing counterrotation of said element when said driving shaft rotates in the opposite direction, and (G) means for continually introducing fluid under pressure into said cylinder successively on opposite sides of said piston whereby said piston reciprocates to and fro to oscillate said driving shaft and drive said element intermittently in one direction only.

8. A device as set forth in claim 7 wherein said means interconnecting said piston and said driving shaft comprises (A) a spiral groove formed in said shaft, (B) a pair of keys formed in said bore of said piston and slidable in said groove, and (C) a sealing member disposed in said groove between said keys.

9. A device as set forth in claim 7 wherein said unidirectional driving clutch comprises (A) a first pawl secured to said driving shaft extension for rotation therewith, (B) a first ratchet wheel loosely mounted on said driving shaft extension in position to be driven in one direction by said first pawl, (C) a second ratchet wheel loosely mounted on said driving shaft extension and connected to said first ratchet wheel and to said rotary driving element, and (D) a second pawl fixedly mounted with respect to said ratchet wheels and engaging said second ratchet wheel in position to prevent rotation of said first and second ratchet wheels in a direction opposite to said direction of rotation in which said first ratchet wheel is driven by said first pawl.

References Cited by the Examiner

UNITED STATES PATENTS

| | | | |
|---|---|---|---|
| 1,072,701 | 9/1913 | Collins | 74—127 |
| 1,283,661 | 11/1918 | Carlson | 74—142 |
| 1,312,999 | 8/1919 | McKillican | 74—127 |
| 2,188,996 | 2/1940 | Carlsen | 74—820 |
| 2,757,559 | 8/1956 | Carpenter | 74—820 |
| 3,022,680 | 8/1962 | Van Roojen | 74—130 |
| 3,142,942 | 8/1964 | Celovsky | 74—824 X |

OTHER REFERENCES

Jones, F. D.; Ingenious Mechanisms for Designers and Inventors, N.Y., The Industrial Press, 1930 (p. 84, FIGURE 12 relied on).

FRED C. MATTERN, JR., *Primary Examiner.*

BROUGHTON F. DURHAM, *Examiner.*

J. A. MARSHALL, *Assistant Examiner.*